A. L. RIKER.
VEHICLE WHEEL.
APPLICATION FILED JUNE 15, 1916.
1,368,411.
Patented Feb. 15, 1921.
3 SHEETS—SHEET 3.
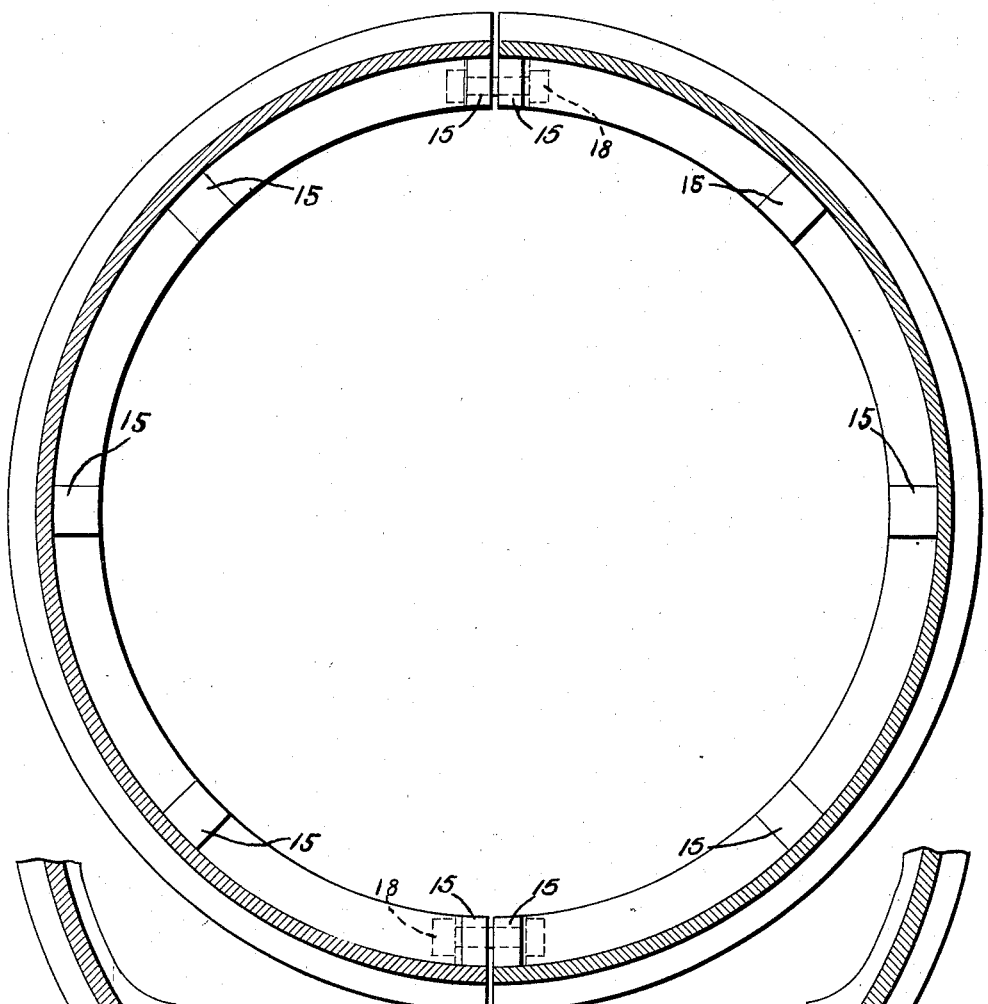
Fig. 6.
Fig. 7.
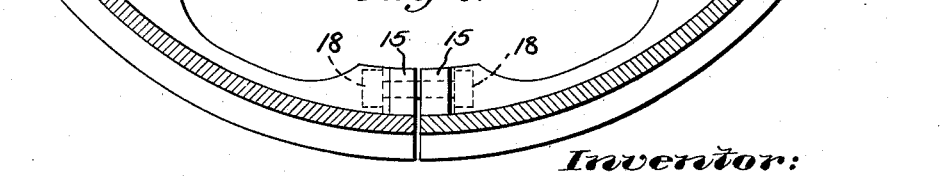

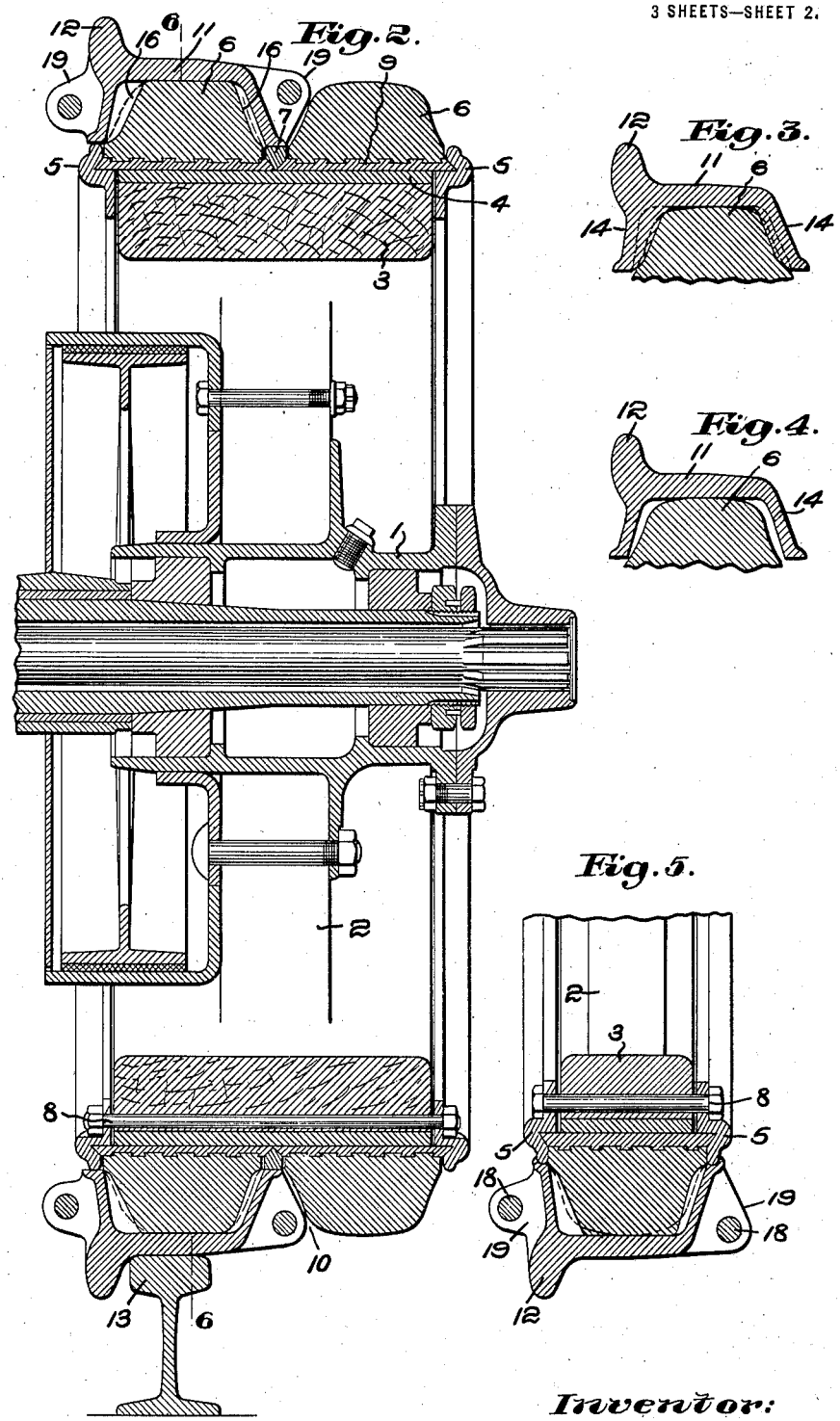

UNITED STATES PATENT OFFICE.

ANDREW L. RIKER, OF FAIRFIELD, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

VEHICLE-WHEEL.

1,368,411.  Specification of Letters Patent.  Patented Feb. 15, 1921.

Application filed June 15, 1916. Serial No. 103,851.

*To all whom it may concern:*

Be it known that I, ANDREW L. RIKER, a citizen of the United States, and a resident of Fairfield, county of Fairfield, and State of Connecticut, have invented an Improvement in Vehicle-Wheels, of which the following description, in connection with the accompanying drawings, is a specification, like characters on the drawings representing like parts.

This invention relates to vehicle wheels, and is more particularly concerned with a wheel which is convertible, so that it may be made readily available for use either on the ordinary highways, or upon railways.

My invention will be best understood by reference to the following description, when taken in connection with the accompanying drawings of three specific embodiments thereof, while its scope will be more particularly pointed out in the appended claims.

In the drawings:

Fig. 2 is a sectional view on line 2—2 of Fig. 1, but showing both of the dual tires in place;

Fig. 3 is a detail sectional view on line 3—3 of Fig. 1;

Fig. 4 is a detail sectional view on line 4—4 of Fig. 1;

Fig. 5 is a detail sectional view in a radial plane of a wheel of the single tire type embodying my invention, the construction being precisely the same as that shown in Fig. 2, except that with the single tire the rim is naturally much narrower than is the case with the dual tire type;

Fig. 6 is a sectional view of the outer rim alone on line 6—6 of Fig. 2; and

Fig. 7 is a partial sectional view similar to Fig. 6, but showing the side flanges apertured at intervals.

Figure 1:
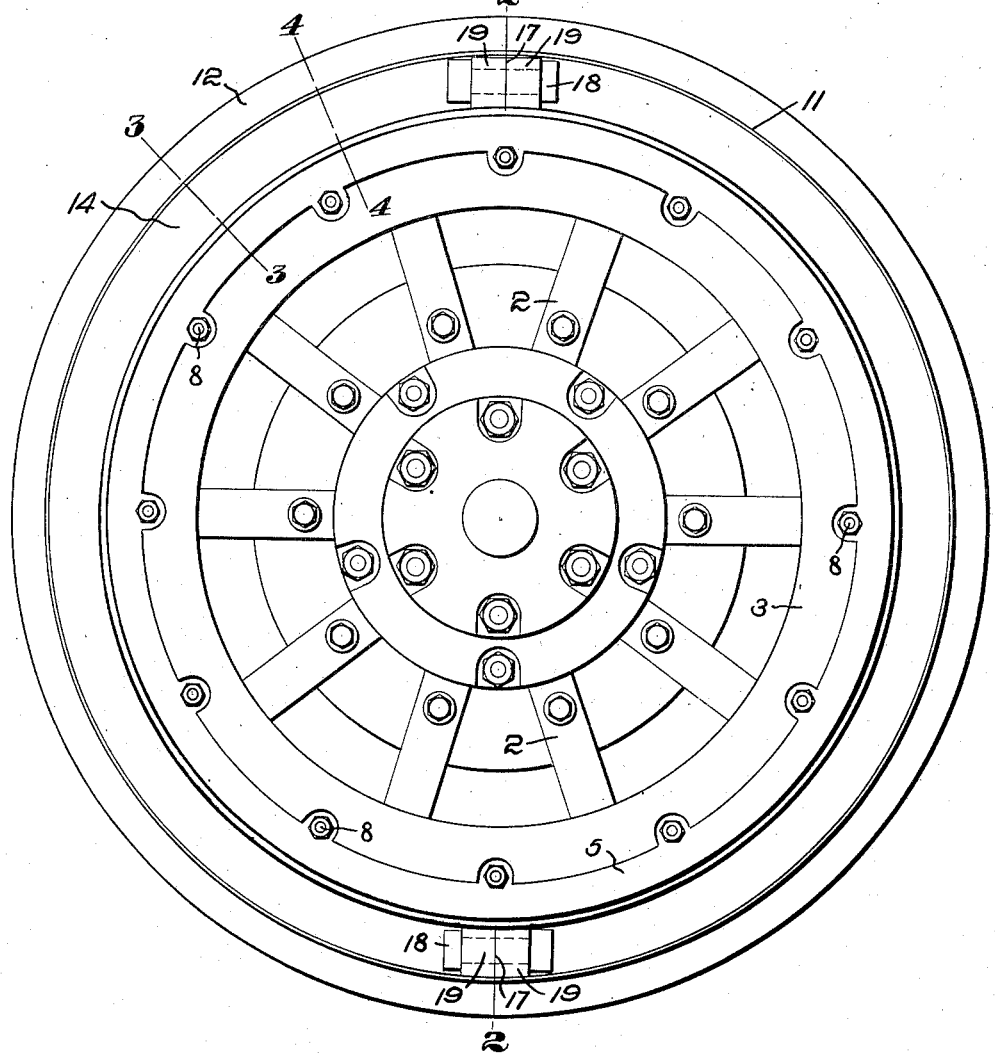
Figure 1 is an elevation of a convertible vehicle wheel embodying my invention, that which is selected for illustration being a motor truck wheel having so-called dual tires, one of which is omitted from this figure for clearness of illustration.

Referring to the drawings, and to the embodiment of my invention which I have selected for illustration, I have there shown a common form of motor truck wheel having a hub 1, spokes 2, felly 3, and rim 4, the latter being provided with a pair of circumferential flanges 5, said flanges acting as retaining means for one or more tires 6, which may be and preferably are compressible, resilient, solid rubber tires of usual form, it being understood, however, that other suitable forms of tires may be employed. In these respects, the forms shown in Figs. 2 and 5 are precisely alike. The form shown in Fig. 2, however, differs from that shown in Fig. 5, in that the rim is provided with a third circumferential flange 7 intermediate the flanges 5. In each case, the flanges 5 are secured in place by suitable bolts 8, by means of which said flanges may be drawn toward each other to clamp between them the tire or tires 6, each of the latter being provided with a suitable base 9 consisting of a ring encircling the rim 4. It will be observed that, in the form shown in Fig. 2, each tire is interposed between the intermediate flange 7, and one of the outer flanges 5, and that the tires are separated from each other by a circumferential space 10.

The wheel as thus constituted is adapted for use upon the ordinary streets and highways, and when so used, the tires 6 of course cushion the vehicle against road shocks, and provide the necessary traction. When, however, circumstances are such that it becomes desirable to run the motor vehicle upon a railroad, this may be readily accomplished by converting the road wheels to flanged railway wheels by the simple addition of outer rims encircling the usual tires. I will now describe the outer rim, by means of which the wheel may be converted for railway use.

Encircling the tire 6 is a rim 11, provided with an outwardly projecting circumferential flange 12 of the form required for use upon rails, one of which is shown at 13 in Fig. 2. The rim 11 is further provided with a pair of inwardly projecting circumferential flanges 14, embracing the tires 6, and contacting with the circumferential surfaces of both of the flanges 5, respectively, in the form shown in Fig. 5, and with one of the outer flanges 5 and the intermediate flange 7, in the form shown in Fig. 2. By this means, the outer rim is at all times held true and concentric with the wheel proper, whether the rubber tire be old or new, and the rim 11 is prevented from turning independently of the wheel. It is not necessary, however, that the flanges 14 continuously contact the flanges 5 and 7 throughout the whole circumference of the latter as in the forms shown in Figs. 1 to 6 inclusive, as it will be apparent from an inspection of the slight modification shown in Fig. 7, that the flanges 14 are apertured and contact with the flanges 5 and 7 only at intervals. The latter form permits the rim to be lightened to a considerable extent.

In the form herein shown, the flanges 14 for the most part are separated from the sides of the tire 6 by spaces, but are provided at intervals with radial ribs or lugs 15, contacting laterally with, and preferably locally compressing, the tire 6, it being observed that these lugs or ribs are provided with opposed tapered or converging surfaces 16, which tend to crowd the sides of the tire inwardly when the outer rim is forced onto the latter. By this means, the rim 11 is centered with relation to the cross-sectional profile of the tire 6.

As a further means for centering the rim 11, the flanges 14 may overlap the flanges 5 as shown in Fig. 5, thus interlocking with the wheel independently of the tire 6 and being thereby held against axial movement regardless of wear upon the sides of the tire.

In order that the outer rim may be conveniently applied to and removed from the tire at will, said rim is composed of a plurality of parts, herein segmental in form, which parts in practice may be, and preferably are, cast and machined as a complete ring, and subsequently sawed or otherwise cut apart at 17—17. The parts of the said rim as thus formed may be secured to each other by suitable fastening means, herein bolts 18 passing through pairs of ears 19 formed on the flanges 14. In the case of the dual tire wheel shown in Fig. 2, one set of ears 19 is disposed in part at least in the circumferential space 10 intermediate the dual tires. Here, the fastening bolts 18 may be conveniently gotten at when mounting or dismounting the rims, and yet they are, to a considerable extent, out of the way when in use.

When the flanged outer rims are in place, they are bound to be true and concentric with the wheel, because, regardless of the wear upon the rubber tires, the outer rims rest upon the inner wheel rims. The outer rims are held against any possible lateral movement by the profile of the rubber tires or by the interlocking engagement with the wheel, and against any circumferential movement by the contact of the outer rim with the wheel rims, as well as by the compression of the rubber tires locally through the engagement of the spaced ribs or lugs therewith.

While I have herein shown and described three specific embodiments of my invention, and have disclosed and discussed in detail the construction and arrangement incidental to these specific applications thereof, it is to be understood that the invention is limited neither to the mere details or relative arrangement of parts, nor to its specific embodiments herein shown, but that extensive deviations from the illustrated forms or embodiments of the invention may be made, without departing from the principles thereof.

Having thus described my invention, what I claim and desire by Letters Patent to secure is:

1. In a convertible railway and roadway wheel, the combination of a rim provided with a pair of circumferential flanges, a tire encircling said rim between said flanges and extending radially beyond the latter, said tire being more or less compressible, and an outer rim encircling said tire and provided with an outwardly projecting circumferential flange and a pair of inwardly projecting circumferential flanges, the latter embracing said tire and contacting with the first-mentioned flanges, respectively, the inwardly projecting flanges of said outer rim being provided with spaced projections contacting laterally with and locally compressing said tire, said outer rim being formed in a plurality of segmental parts having pairs of coöperating ears, and bolts passing through said ears to fasten said segmental parts together.

2. In a convertible railway and roadway wheel, the combination of a rim provided with three circumferential flanges one intermediate the other two, dual tires encircling said rim and interposed each between the intermediate flange and one of the outer flanges, said tires being separated by a circumferential space, and an outer rim encircling one of said tires and provided with an outwardly projecting circumferential flange and a pair of inwardly projecting circumferential flanges, the latter embracing such tire and contacting respectively with said intermediate flange and one of said outer flanges, said outer rim being formed in a plurality of segmental parts having pairs of coöperating ears some of which are disposed in part at least in said circumferential space, and bolts passing through said ears to fasten said segmental parts together.

3. A convertible railway and roadway wheel comprising, in combination, a rim, a tire encircling said rim, and an outer rim encircling said tire and provided with a plurality of spaced projections contacting laterally with said tire.

4. A convertible railway and roadway wheel comprising, in combination, a rim, a compressible tire encircling said rim, and an outer rim encircling said tire and provided with one or more projections engaging and locally compressing said tire.

5. A convertible railway and roadway wheel comprising, in combination, a rim, a compressible tire encircling said rim, and an outer rim encircling said tire and having a pair of flanges embracing said tire and provided with a plurality of projections laterally engaging the latter.

6. A convertible railway and roadway wheel comprising, in combination, a rim, a resilient tire encircling said rim, and an outer rim encircling said tire and having tapered surfaces between which said resilient tire is held under compression.

7. The combination with a wheel and its tire, of a rim encircling and having a pair of inwardly projecting flanges embracing said tire and resting upon circumferential portions of said wheel, said flanges having between them a tire-receiving entrance greater in width than the normal width of said tire, said rim having also an outwardly projecting flange substantially in alinement with one of the first-mentioned flanges.

8. The combination with a wheel and its tire, of a rim encircling and having a pair of flanges embracing said tire and resting upon a circumferential portion of said wheel, said flanges being provided with spaced lugs engaging the sides of said tire.

9. The combination with a wheel and its tire, of a rim encircling said tire and having a pair of diverging flanges embracing said wheel and resting upon circumferential portions of the latter irrespective of said tire, said flanges being spaced apart a distance greater than the thickness of said tire.

10. The combination with a wheel and spaced tires thereon, of a rim encircling one of said tires and having two spaced flanges one extending into the space between said tires.

11. The combination with a wheel and dual tires thereon, of a rim encircling one of said tires and provided with a circumferential rail flange, and rim-clamping means between said tires.

12. The combination with a wheel and tires thereon separated by the annular space, of an outer rim resting on said wheel at two points, one in said annular space and the other outside said annular space.

13. The combination with a wheel and tires thereon separated by an annular space open at its circumference, of an outer rim, and means in said annular space to secure said rim to said wheel.

14. The combination with a wheel and tires thereon separated by an annular space, of an outer rim provided with two spaced flanges embracing one of said tires and resting on said wheel, one of said flanges being located in said annular space.

15. In a convertible railway and roadway wheel, the combination of a roadway tire, a railway tire encircling said roadway tire, and an inner support on which said tires are individually supported.

16. In a convertible railway and roadway wheel, the combination of a roadway tire, a railway tire encircling and embracing said roadway tire, and an inner support on which each of said tires is supported independently of the other.

17. In a convertible railway and roadway wheel, the combination of a resilient roadway tire, a rigid railway tire encircling and embracing said roadway tire, and an inner support on which each of said tires is supported independently of the other.

18. In a convertible railway and roadway wheel, the combination of a resilient roadway tire, a rigid radially split railway tire encircling and embracing said roadway tire, an inner support on which each of said tires is supported independently of the other.

19. In a convertible railway and roadway wheel, the combination of a resilient roadway tire, a rigid radially expansible and contractible railway tire encircling and provided with a pair of flanges embracing said roadway tire, said railway tire being also provided with a rail-flange, a support on which each of said tires is supported independently of the other, and means providing for attaching said railway tire to and detaching the same from said support without disturbing said roadway tire.

20. In a convertible railway and roadway wheel, the combination of a resilient roadway tire, a rigid radially expansible and contractible railway tire encircling and provided with a pair of flanges embracing said roadway tire, said railway tire being also provided with a rail-flange, a support on which each of said tires is supported independently of the other, said railway tire and support having interengaging means holding said railway tire against axial displacement, and means providing for attaching said railway tire to and detaching the same from said support without disturbing said roadway tire.

21. In a convertible railway and roadway wheel, the combination of a resilient roadway tire, a railway tire whose tread surface has a greater diameter than that of said roadway tire, and an inner support on which said railway tire is supported independently of said roadway tire.

22. In a convertible railway and roadway wheel, the combination of a roadway tire, the railway tire 11 with its flanges 12 and 14, 14, the latter embracing said roadway tire, and an inner support for the flanges 14.

23. In a convertible railway and roadway wheel, the combination of a roadway tire, the railway tire 11 with its flanges 12 and 14 and lugs 19, an inner support for the flanges 14, and the fastening elements 18.

In testimony whereof, I have signed my name to this specification.

ANDREW L. RIKER.

Witnesses:
 B. J. CONNOLLY,
 F. E. LYTLE.